United States Patent [19]

Nullmeyer et al.

[11] Patent Number: 4,767,358
[45] Date of Patent: Aug. 30, 1988

[54] BATTERY ADAPTER FOR C AND D SIZE APPLICATIONS

[76] Inventors: Richard Nullmeyer, 2715 Killdeer Ct., Union City, Calif. 94587; John Nullmeyer, 5292 Falmouth Pl., Newark, Calif. 94560

[21] Appl. No.: 62,111

[22] Filed: Jun. 12, 1987

[51] Int. Cl.$^4$ .............................................. H01M 2/10
[52] U.S. Cl. ..................................... 439/500; 429/100
[58] Field of Search ....................... 429/96, 100, 122; 439/500, 620

[56] References Cited

U.S. PATENT DOCUMENTS

| | | | |
|---|---|---|---|
| 2,958,069 | 10/1960 | Redick et al. | 439/741 |
| 3,684,583 | 8/1972 | Lehnen et al. | 429/100 |
| 3,969,148 | 7/1976 | Trattner | 429/100 |
| 3,990,919 | 10/1976 | Krueger | 429/100 |
| 4,020,245 | 4/1977 | Mabuchi et al. | 429/100 |
| 4,057,677 | 11/1977 | Mabuchi | 429/100 |
| 4,142,026 | 2/1979 | Zordan | 429/100 |
| 4,397,920 | 8/1983 | Trattner | 429/100 |

FOREIGN PATENT DOCUMENTS 1441645  7/1976  United Kingdom ................ 429/100

Primary Examiner—Gil Weidenfeld
Assistant Examiner—Gary F. Paumen

[57] ABSTRACT

Adapter allowing a physically smaller standard size battery to fit in an application where a larger physical sized battery would normally be needed. The adapter is a simple two-piece construction which can be economically manufactured from plastic and has a full-sized solid electrical contact which prevents it from being impaled on coil spring terminals used in some battery compartments. The smaller adapter allows a standard AA size battery, or a standard AA size rechargable cell, to be used in a C cell application and has the full-sized contact molded in place to prevent removal. The larger adapter allows a standard C size battery, or a standard C size rechargable cell, to be used in a D cell application and has a full-sized contact installed. The smaller adapter may be slipped into the larger adapter thus allowing a standard AA battery, or a standard AA rechargable cell, to be used in a D cell application.

3 Claims, 3 Drawing Sheets

BATTERY ADAPTER FOR C AND D SIZE APPLICATIONS

BACKGROUND

1. Background—Field of Invention

The present invention relates to battery adapters and, specifically, to adapters allowing physically smaller batteries to fit in an application where a larger physical sized battery would normally be needed.

2. Background—Discussion of Prior Art

Heretofore, prior art reveals several different approaches to the design of these adapters, many of which are complicated and difficult to manufacture. Some are simple designs which appear to have weaknesses in electrical contact arrangement and in the method of forming the support member for the dry cell. Other prior art addresses the AA to D adapter, but not specifically the AA to C adapter. Those who do address the AA to C combination generally have not provided for proper electrical contact with the coil spring in some applications. They rely on the smaller diameter of the negative contact on the AA battery to form the sole contact in place of the larger contact that a C cell normally has. One prior art D size adapter design has a slotted electrical contact which could be penetrated by the negative spring terminal used in some battery compartments and thereby impale the adapter on the spring. Another design relates to rechargable non-standard size batteries. And yet another utilizes a fully encapsulating adapter which requires multiple pieces to form the battery chamber.

Our novel invention overcomes the previous disadvantages of prior art, by simplifying the design of the adapter and the electrical contacts. Each of our adapters, both AA to C and C to D versions, are constructed of only two pieces. A supporting one piece molded shell and a single electrical contact. Our invention also addresses the use of AA batteries, either rechargable or non-rechargable, for use in C applications, and the use of C size batteries, either rechargable or non-rechargable, for use in D applications. Additionally, the use of both adapters in combination, will permit AA size rechargable and non-rechargable batteries to be used in any D application. The electrical contact area of our C size adapter is comparable to that of a C size battery, thus assuring proper electrical connection with a coil spring terminal when required. The solid negative electrical contact plate of our D adapter design will not impale the adapter on any coil spring terminal because the spring cannot penetrate the electrical contactor.

OBJECTS AND ADVANTAGES

Accordingly several objects and advantages of our invention include a simplified design capable of being produced in volume, a contact arrangement that is more reliable and achieves proper contact in any device it is used in, and a way to hold these contacts in a firm and fixed position.

Our inventions simplified design stems from a two-piece construction having the major benefit of complete retention of the electrical contact. Thus it avoids problems cited in prior art of multiple pieces which hold the contacts in place. These multiple pieces can become loosened and cause the contacts to fall out of the adapter or become non-functional. This invention solves the disadvantage of multiple piece construction.

Our inventions contact design also solves a previously unrecognized problem related to contact diameter. In the AA to C version, for example, prior art merely provides a hollow tube to insert the AA battery into, to adapt it to a C application. This means that the negative contact of the AA battery is providing the sole electrical contact surface for this C cell adapter. This prior art adapter will not work in all applications, such as when a coil spring terminal is utilized in a battery compartment. The smaller AA contact can pass through the inner portion of the coil spring and not make an electrical connection at all. Our new invention embodies a full sized contact surface equivalent in size to the battery which it is designed to replace, thus can be utilized in any application that a C or D battery may be used in.

Our invention also incorporates a simple contact retention design. The contact on the C adapter is fully encased around its perimeter with plastic material making it virtually improbable that it could come loose. Other prior art makes no provision for this contact retention at all. On our D adapter the contact is full sized, fully intact, and has no breaks in the contact surface. Prior art designs are either slotted or pieced together to form their connection with the battery. Our inventions contact provides continuous electrical integrity between the adapter and the battery at all times, and can only be removed from the adapter with a concerted effort.

In addition, our adapter invention may be utilized to replace a D sized cell with a AA cell. By inserting our C cell adapter into our D cell adapter, an application requiring the larger D cell battery may use the smaller AA battery with complete electrical conductivity throughout.

And, as is apparent, our invention is simpler in both design and functionality, can assure proper electrical contact in any application intended for a battery, and securely holds the contact in place throughout the life of the cell adapter.

Further objects and advantages of our new invention will become apparent from a consideration of the drawings and ensuing description of it.

CONCLUSION, RAMIFICATIONS AND SCOPE OF INVENTION

Figure 1:
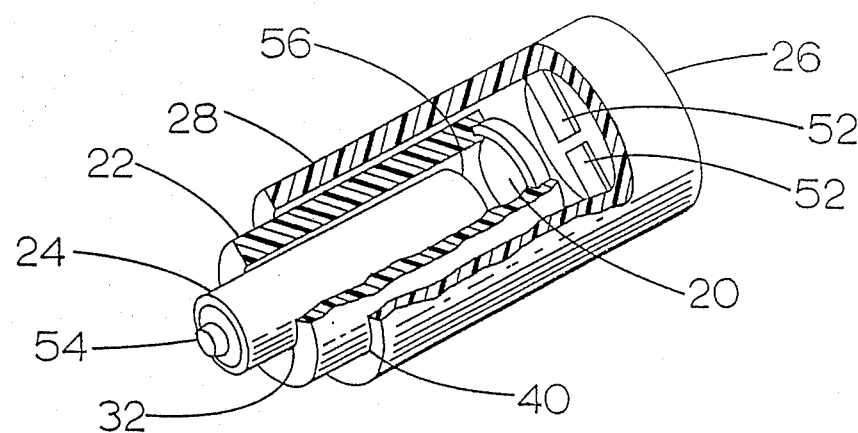
FIG. 1 is a perspective view of our invention showing the relative operational position of our inventive D cell adapter, our inventive C cell adapter and a standard AA battery.

Thus the reader will see that the battery adapters of this invention provide a highly reliable, simple, yet economical device which can be used by persons of any age.

While, my above description contains many specificities, these should not be construed as limitations on the scope of the invention, but rather as an exemplification of one preferred embodiment thereof. Many other variations are possible. For example the housing and sleeve could be molded in a variety of colors. And, rather than molding in the solid cupped disk negative electrical contact, it could be popped in with a mallet. The solid negative electrical contact plate fingers could have dimples in them to improve the electrical contact with the battery even more. The end of the D adapter housing could have a slight recess to avoid the solid negative electrical contact plate from being caught on other objects.

Accordingly, the scope of the invention should be determined not by the embodiment(s) illustrated, but by the appended claims and their legal equivalents.

REFERENCE NUMERALS

20 - SOLID CUPPED DISK NEGATIVE ELECTRICAL CONTACT
22 - SLEEVE BODY
24 - STANDARD AA BATTERY (REF)
26 - SOLID NEGATIVE ELECTRICAL CONTACT PLATE
28 - HOUSING
30 - STANDARD C BATTERY (REF)
32 - OPENING IN 22
34 - OFFSET IN 20
36 - FLANGED SURFACE ON 20
38 - SLOTS IN 28
40 - OPENING IN 28
42 - FOLD IN 26
44 - FOLD IN 26
46 - ELECTRICAL CONTACT SURFACE OF 20
48 - INSIDE ELECTRICAL CONTACT SURFACE OF 20
50 - ELECTRICAL CONTACT SURFACE OF 26
52 - INSIDE ELECTRICAL CONTACT FINGER OF 26
54 - POSITIVE CONTACT OF 24 (REF)
56 - NEGATIVE CONTACT OF 24 (REF)
58 - POSITIVE CONTACT OF 30 (REF)
60 - NEGATIVE CONTACT OF 30 (REF)
62 - FLOOR IN 28

SPECIFICATION

Referring to FIG. 1, the adapters of the current invention are shown in relative operational position when used in combination with each other and a standard AA size battery. Specifically, the sleeve body 22 is intended to be an injection molded plastic part, but could be constructed in any manner that would yield the same singular part. The plastic can be any suitable plastic material that is electrically non-conductive and injection moldable. The outside diameter of sleeve body 22 is the same diameter as a standard C cell battery. The solid cupped disk negative electrical contact 20 is intended to be made of a sufficiently thin cold rolled steel and fabricated to shape by stamping. In actuality, the part can be made of any electrically conductive material which can be fabricated to the shape of the solid cupped disk negative electrical contact 20 and still resist the heat required during the injection molding process. The standard AA battery 24 is inserted into the opening 32 of sleeve body 22, where opening 32 is of sufficient diameter to accept the standard AA battery 24 without any significant interference. The negative contact 56 of the standard AA battery 24 will then be in electrical contact with the solid cupped disk negative electrical contact 20. The adapter/battery combination (20, 22 and 24 respectively) is inserted into the opening 40 in housing 28, where opening 40 is of sufficient diameter to accept this adapter/battery combination (20, 22 and 24 respectively) without any significant interference. The housing 28 is intended to be an injection molded plastic part, but could be constructed in any manner that would yield the same singular part. The plastic can be any suitable plastic material that is electrically non-conductive and injection moldable. The outside diameter of housing 28 is the same diameter as a standard D cell battery. The solid negative electrical contact plate 26 is intended to be made of a sufficiently thin cold rolled steel and fabricated to shape by stamping. In actuality, the part can be made of any electrically conductive material which can be fabricated to the shape of the solid negative electrical contact plate 26. The solid cupped disk negative electrical contact 20 of the adapter/battery combination (20, 22 and 24 respectively) will then be in electrical contact with the inside electrical contact fingers 52 of the solid negative electrical contact plate 26. The positive contact 54 of the standard AA battery 24 then becomes the positive contact of the entire dual adapter/battery combination (20, 22, 26, 28 and 24 respectively). The solid negative electrical contact plate 26 outside diameter is approximately the same diameter as a standard D cell battery negative contact. The solid negative electrical contact plate 26 has no breaks in the contact surface to avoid the adapter from being impaled on any coil spring terminal, such as in most flashlights, because the coil spring terminal cannot penetrate the solid electrical contact surface. The standard AA battery 24 is retained in the dual adapter/battery combination by the force applied from the spring type terminals used in most battery compartments. This force also maintains electrical continuity as well. This particular combination embodiment will then adapt a standard AA battery to any D cell application.

Figure 2:
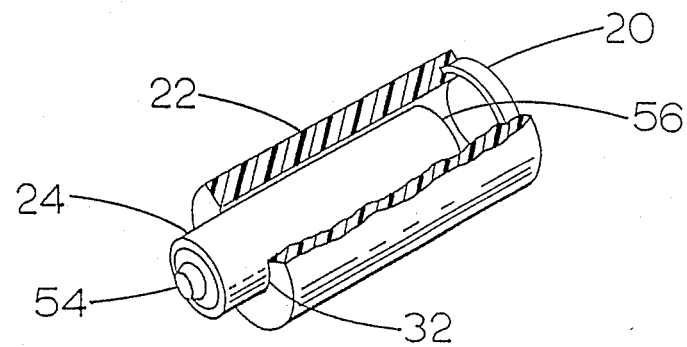
FIG. 2 is a perspective view of our invention showing the relative operational position of our inventive C cell adapter and a standard AA battery.

FIG. 2 is a perspective view of one embodiment of our invention showing the relative operational position of our inventive C cell adapter and a standard AA battery. Specifically, the sleeve body 22 is intended to be an injection molded plastic part, but could be constructed in any manner that would yield the same singular part. The plastic can be any suitable plastic material that is electrically non-conductive and injection moldable. The outside diameter of sleeve body 22 is the same diameter as a standard C cell battery. The solid cupped disk negative electrical contact 20 is intended to be made of a sufficiently thin cold rolled steel and fabricated to shape by stamping. In actuality, the part can be made of any electrically conductive material which can be fabricated to the shape of the solid cupped disk negative electrical contact 20 and still resist the heat required during the injection molding process. The standard AA battery 24 is inserted into the opening 32 of sleeve body 22, where opening 32 is of sufficient diameter to accept the standard AA battery 24 without any significant interference. The negative contact 56 of the standard AA battery 24 will then be in electrical contact with the solid cupped disk negative electrical contact 20. Because a standard AA battery is approximately the same length as a standard C battery the solid cupped disk negative electrical contact 20 will be fabricated from a metallic electrically conductive material thin enough so as not to interfere with the use of this C cell adapter in any C cell application. The positive contact 54 of the standard AA battery 24 then becomes the positive contact of the entire adapter/battery embodiment (20,22 and 24 respectively). The solid cupped disk negative electrical contact 20 outside diameter is approximately the same diameter as a standard C cell battery negative contact. The standard AA battery 24 is retained in the sleeve body 22 by the force applied from the spring type terminals used in most battery compartments. This force also maintains electrical continuity as well. This particular combination embodiment will then adapt a standard AA battery to any C cell application.

Figure 3:
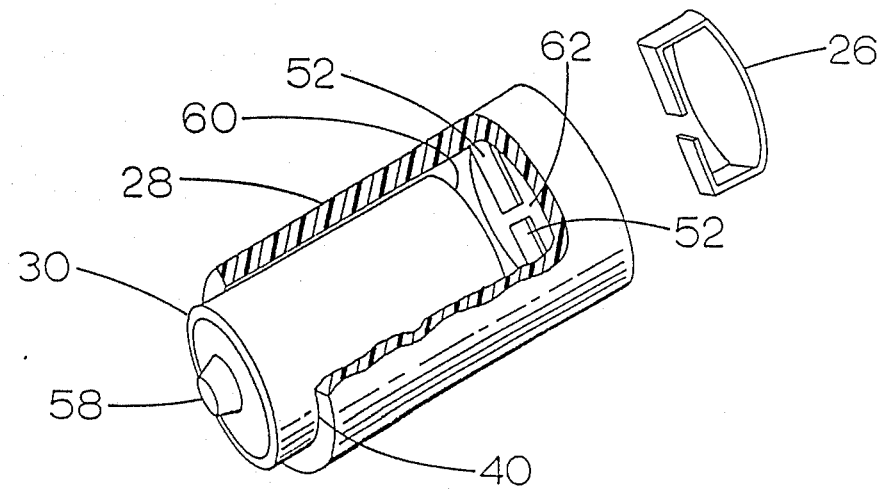
FIG. 3 is a perspective view of our invention showing the relative operational position of our inventive D cell adapter and a standard C battery.

FIG. 3 is a perspective view of another embodiment of our invention showing the relative operational position of our inventive D cell adapter and a standard C battery. Specifically, the housing 28 is intended to be an injection molded plastic part, but could be constructed in any manner that would yield the same singular part. The plastic can be any suitable plastic material that is electrically non-conductive and injection moldable. The outside diameter of housing 28 is the same diameter as a standard D cell battery. The solid negative electrical contact plate 26 is intended to be made of a sufficiently thin cold rolled steel and fabricated to shape by stamping. In actuality, the part can be made of any electrically conductive material which can be fabricated to the shape of the solid negative electrical contact plate 26. The standard C battery 30 is inserted into the housing 28 at opening 40, where opening 40 is of sufficient diameter to accept the standard AA battery 30 without any significant interference. The negative contact 60 of the standard C battery 30 will then be in electrical contact with the inside electrical contact finger 52 of the solid negative electrical contact plate 26. Because a standard C battery is significantly shorter than a standard D cell battery a floor 62 has been molded into one end of the housing 28 of a thickness to compensate for the difference in length between a standard C and D battery. The inside electrical contact fingers 52 of the solid negative electrical contact plate 26 have been inserted through slots molded into floor 62 of housing 28 which run parallel to the sides of housing 28 through to the interior of housing 28 where the inside electrical contact fingers 52 of the solid negative electrical contact plate 26 have been folded over floor 62 of housing 28 to form an inside electrical contact finger 52. The positive contact 58 of the standard C battery 30 then becomes the positive contact of the entire adapter/battery combination embodiment (26,28 and 30 respectively). The solid negative electrical contact plate 26 outside diameter is approximately the same diameter as a standard D cell battery negative contact. The solid negative electrical contact plate 26 has no breaks in the contact surface to avoid the adapter from being impaled on any coil spring terminal because the coil spring terminal cannot penetrate the electrical contact surface. The standard C battery 30 is retained in the housing 28 by the force applied from the spring type terminals used in most battery compartments. This force also maintains electrical continuity as well. This particular combination embodiment will then adapt a standard C battery to any D cell application.

Figure 4:
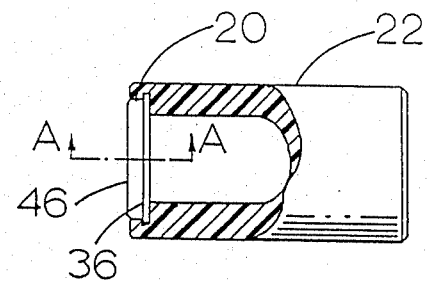
FIG. 4 is a perspective cutaway view showing the inventive C adapter housing with the solid cupped disk negative electrical contact in place and encased by the sleeve body.

FIG. 4 is a perspective cutaway view showing the inventive C adapter housing with the solid cupped disk negative electrical contact in place and encased by the sleeve body. Specifically, the adapter housing is comprised of a solid cupped disk negative electrical contact 20 and the sleeve body 22. The sleeve body 22 is intended to be an injection molded plastic part, but could be constructed in any manner that would yield the same singular part. The plastic can be any suitable plastic material that is electrically non-conductive and injection moldable. The outside diameter of sleeve body 22 is the same diameter as a standard C cell battery. The solid cupped disk negative electrical contact 20 is intended to be made of a sufficiently thin cold rolled steel and fabricated to shape by stamping. In actuality, the part can be made of any electrically conductive material which can be fabricated to the shape of the solid cupped disk negative electrical contact 20 and still resist the heat required during the injection molding process. The solid cupped disk negative electrical contact 20 is molded into the end of the sleeve body 22 during the injection molding process. This encasement of the solid cupped disk negative electrical contact 20 is accomplished by plastic flowing around the flanged surface 36 of the solid cupped disk negative electrical contact 20. The outside electrical contact surface 46 of the solid cupped disk negative electrical contact 20 protrudes slightly past the end of the sleeve body 22 to insure proper electrical contact in any battery compartment.

Figure 5:
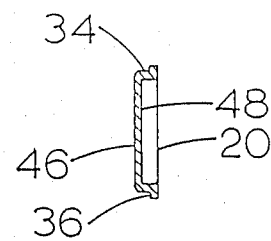
FIG. 5 is a plan view in cross-section of the inventive C size adapter solid cupped disk negative electrical contact taken along section lines A—A of FIG. 4.

FIG. 5 is a plan view in cross-section of the inventive C size adapter solid cupped disk negative electrical contact taken along section lines A—A of FIG. 4. Specifically, the solid cupped disk negative electrical contact 20 is stamped to a size such that the outside diameter of flanged surface 36 is slightly less than the outside diameter of sleeve body 22 (Ref FIG. 4), but greater than the inside diameter of sleeve body 22. The solid cupped disk negative electrical contact 20 is intended to be made of a sufficiently thin cold rolled steel and fabricated to shape by stamping. In actuality, the part can be made of any electrically conductive material which can be fabricated to the shape of the solid cupped disk negative electrical contact 20 and still resist the heat required during the injection molding process. The outside diameter of electrical contact surface 46 is approximately the same as the negative contact of a standard C size battery. The offset 34 between flanged surface 36 and the inside electrical contact surface 48 is sufficient enough to allow plastic material to flow around and encase flanged surface 36 during injection molding to provide retention of the solid cupped disk negative electrical contact 20 in sleeve body 22 and still leave the inside electrical contact surface 48 free of plastic material.

Figure 6:
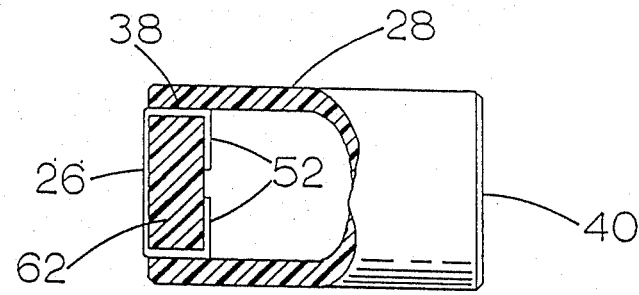
FIG. 6 is a perspective cutaway view showing the inventive D adapter housing with the solid negative electrical contact plate in place and the contact fingers protruding into the inner cavity.

FIG. 6 is a perspective cutaway view showing the inventive D adapter housing with the solid negative electrical contact plate in place and the contact fingers protruding into the inner cavity. Specifically, the adapter is comprised of a solid negative electrical contact plate 26 and the housing 28 and is shown after assembly. The housing 28 is intended to be an injection molded plastic part, but could be constructed in any manner that would yield the same singular part. The plastic can be any suitable plastic material that is electrically non-conductive and injection moldable. The outside diameter of housing 28 is the same diameter as a standard D cell battery. The solid negative electrical contact plate 26 is intended to be made of a sufficiently thin cold rolled steel and fabricated to shape by stamping. In actuality, the part can be made of any electrically conductive material which can be fabricated to the shape of the solid negative electrical contact plate 26. Because a standard C battery is significantly shorter that a standard D battery a floor 62 has been molded into one end of the housing 28 of a thickness to compensate for the difference in length between a standard C and D battery. The inside electrical contact fingers 52 of the solid negative electrical contact plate 26 have been inserted through slots 38 molded into floor 62 of housing 28 which run parallel to the sides of housing 28 where the inside electrical contact fingers 52 of the solid negative electrical contact plate 26 have been folded over floor 62 of housing 28 to form an inside electrical contact finger 52. The negative contact of a standard C battery would then contact the inside electrical contact fingers 52 of the solid negative electrical contact plate 26 when the battery is inserted through opening 40 of housing 28.

Figure 7:
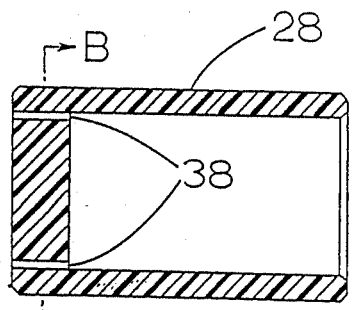
FIG. 7 is a plan view in cross-section of the inventive D size adapter housing showing the housing only.

FIG. 7 is a plan view in cross-section of the inventive D size adapter housing, showing the housing only. Specifically, this FIG. 7 shows the housing 28 and slots 38 for clarity.

Figure 8:
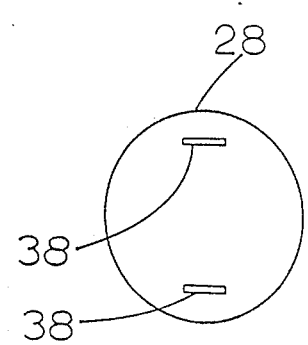
FIG. 8 is a plan view in cross-section of the inventive D size adapter housing taken along section line B—B of FIG. 7.

FIG. 8 is a plan view in cross-section of the inventive D size adapter housing taken along section line B—B of FIG. 7. Specifically, this FIG. 8 shows an end view of the housing 28 with slots 38 also shown for clarity.

Figure 9:
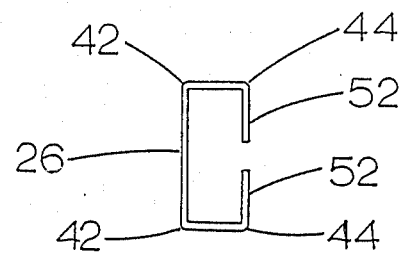
FIG. 9 is a plan view in cross-section of the inventive D size adapter solid negative electrical contact plate as shown in FIG. 6, with the housing omitted for clarity.

FIG. 9 is a plan view of the inventive D size adapter solid negative electrical contact plate as shown in FIG. 6, with the housing omitted for clarity. Specifically, this FIG. 9 shows the solid negative electrical contact plate 26 formed as if it were installed in housing 28. It has two right angle folds at 42 and 44 in the thin electrically conductive material. The first fold at 42 allows installation of the solid negative electrical contact plate 26 into the slots 38 in housing 28 as shown in FIG. 6. The second fold at 44 positions the inside electrical contact fingers 52 to form an inside electrical contact surface and retains the solid negative electrical contact plate 26 in the housing 28. The inside electrical contact fingers 52 will then contact the negative contact 60 of the standard C battery 30 as shown in FIG. 3, or the solid cupped disk negative electrical contact 20 of our inventive C size adapter as shown in FIG. 2.

Figure 10:
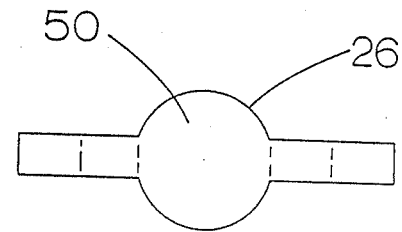
FIG. 10 is a plan view of the solid negative electrical contact plate of the inventive D size adapter showing the inside electrical contact fingers in the flat unfolded position.

FIG. 10 is a plan view of the solid negative electrical contact plate of the inventive D size adapter showing the inside electrical contact fingers in the flat unfolded position. Specifically, the outside diameter of electrical contact surface 50 of the solid negative electrical contact plate 26 is approximately the same as a standard D size battery. This full size solid surface provides approximately the same electrical contact area as a standard D size battery, thus cannot get impaled on the coil spring terminals used in some battery compartments.

What I claim is:

1. An adapter for allowing a device requiring a standard D size battery to use a second smaller standard C size battery, comprising:
    a one piece molded non-conductive plastic cylindrical means having an outside surface whose diameter is consistently equivalent to the diameter of a standard D. size battery, and having an external body length equal to the length of the body of said standard D size battery, not including the length of the positive terminal which protrudes beyond the body of said standard D size battery,
    a cavity extending into one end of said cylindrical means whose inside circumference is consistently concentric with the outside surface of said cylindrical means, said cavity having a diameter slightly greater than the outside diameter of said standard C size battery so that said standard C size battery will easily but not loosely enter said cavity, said cavity having a depth slightly greater than the length of the body of said standard C size battery, not including the length of the positive terminal which protrudes beyond the body of said standard C size battery,
    a floor at the second end of said cylindrical means formed between the longer external length of said cylinder and the shorter internal depth of said cavity, said floor being integrally molded with slots,
    a disk-shaped electrically conductive contact means comprising a contact disk and fingers attached to the periphery thereof to attach said contact disk to said floor by passing said fingers through said slots and folding them flat against the internal surface of said floor to provide firm attachment to said floor and to provide an electrical contact surface perpendicular to the longitudinal axis of said cavity whereby upon insertion of a standard C size battery into said cavity, said fingers will provide electrical contact through said floor to the external surface of said disk, the diameter of said disk being equivalent to the diameter of the negative contact of a standard D size battery, said disk having a flat continuous surface,
    said floor having a thickness such that the combination of its thickness, the thickness of said contact means, the thickness of said fingers when folded flat against said floor, and the length of a standard C size battery including its positive terminal, equals the total length of a standard D size battery including its positive terminal.

2. An adapter allowing a device requiring a standard C size battery to use a smaller standard AA size battery, comprising:
    a one piece molded non-conductive plastic cylindrical means having an outside surface whose diameter is equal to the diameter of a standard C size battery and whose length is equal to the length of the body of a standard C size battery not including the length of the positive terminal which protrudes beyond the body of said standard C size battery,
    a cavity through the full length of said cylindrical means whose inside circumference is consistently concentric with the outside surface of said cylindrical means, and having an inside diameter slightly greater than the outside diameter of a standard AA size battery, so as to permit said standard AA size battery to enter easily but not loosely into said cavity, a cup-shaped electrical contact means comprising a disk and a flange extending normal thereto, with the external diameter of said flange being slightly less than the outside diameter of said cylindrical means, the external diameter of said disk being slightly less than the external diameter of said flange and being greater than the diameter of a standard AA size battery, said disk protruding slightly past the end of said cylindrical means, said contact means being molded into said cylindrical means, said contact means being of thin electrically conductive material.

3. An assembly for allowing a device requiring a standard D size battery to use a smaller AA size battery, comprising:

a first adapter for allowing a device requiring a standard D size battery to use a second smaller standard C size battery, comprising:

a one piece molded non-conductive plastic cylindrical means having an outside surface whose diameter is consistently equivalent to the diameter of a standard D size battery, and having an external body length equal to the length of the body of said standard D size battery, not including the length of the positive terminal which protrudes beyond the body of said standard D size battery, a cavity extending into one end of said cylindrical means whose inside circumference is consistently concentric with the outside surface of said cylindrical means, said cavity having a diameter slightly greater than the outside diameter of said standard C size battery so that said standard C size battery will easily but not loosely enter said cavity, said cavity having a depth slightly greater than the length of the body of said standard C size battery, not including the length of the positive terminal which protrudes beyond the body of said standard C size battery, a floor at the second end of said cylindrical means formed between the longer external length of said cylinder and the shorter internal depth of said cavity, said floor being integrally molded with slots, a disk-shaped electrically conductive contact means comprising a contact disk and fingers attached to the periphery thereof to attach said contact disk to said floor by passing said fingers through said slots and folding them flat against the internal surface of said floor to provide firm attachment to said floor and to provide an electrical contact surface perpendicular to the longitudinal axis of said cavity whereby upon insertion of a standard C size battery into said cavity, said fingers will provide electrical contact through said floor to the external surface of said disk, the diameter of said disk being equivalent to the diameter of the negative contact of a standard D size battery, said disk having a flat continuous surface, said floor having a thickness such that the combination of its thickness, the thickness of said contact means, the thickness of said fingers when folded flat against said floor, and the length of a standard C size battery including its positive terminal, equals the total length of a standard D size battery including its positive terminal; and a second adapter allowing a device requiring a standard C size battery to use a smaller standard AA size battery, comprising:

a one piece molded non-conductive plastic cylindrical means having an outside surface whose diameter is equal to the diameter of a standard C size battery and whose length is equal to the length of the body of a standard C size battery not including the length of the positive terminal which protrudes beyond the body of said standard C size battery, a cavity through the full length of said cylindrical means whose inside circumference is consistently concentric with the outside surface of said cylindrical means, and having an inside diameter slightly greater than the outside diameter of a standard AA size battery, so as to permit said standard AA size battery to enter easily but not loosely into said cavity, a cup-shaped electrical contact means comprising a disk and a flange extending normal thereto, with the external diameter of said flange being slightly less than the outside diameter of said cylindrical means, the external diameter of said disk being slightly less than the external diameter of said flange and being greater than the diameter of a standard AA size battery, said disk protruding slightly past the end of said cyilndrical means, said contact means being molded into said cyilndrical means, said contact means being of thin electrically conductive material; and whereby said second adapter is inserted into said cavity of said first adapter.

* * * * *